No. 783,812. PATENTED FEB. 28, 1905.
U. ANCILLOTTI.
AMUSEMENT APPARATUS.
APPLICATION FILED MAR. 24, 1904.

Witnesses,
Frank O'Connor.
N. H. Pumphrey.

Inventor,
Ugo Ancillotti
by R. Parkersmith
his Attorney.

No. 783,812. Patented February 28, 1905.

UNITED STATES PATENT OFFICE.

UGO ANCILLOTTI, OF NEW YORK, N. Y., ASSIGNOR TO THE CORPORATION OF BARNUM & BAILEY, LTD., OF THE STATE OF NEW YORK, A CORPORATION OF ENGLAND.

AMUSEMENT APPARATUS.

SPECIFICATION forming part of Letters Patent No. 783,812, dated February 28, 1905.

Application filed March 24, 1904. Serial No. 199,864.

*To all whom it may concern:*

Be it known that I, UGO ANCILLOTTI, a subject of the King of Italy, and a resident of the borough of Manhattan, city, county, and State of New York, have invented certain new and useful Improvements in Amusement Apparatus, of which the following is a specification.

My invention relates generally to amusement apparatus; and it more specifically consists of an improved arrangement of runways and tracks whereby a vehicle may be set in rapid motion and forced to describe a predetermined trajectory over an open space, turning a somersault, and alighting in safety upon a receiving-track located in said trajectory, but separated by a considerable space from the discharging end of the first track or runway, from which the vehicle has received its initial direction of flight.

The preferred form of my apparatus is illustrated in the accompanying two sheets of drawings, in which—

Figure 1:
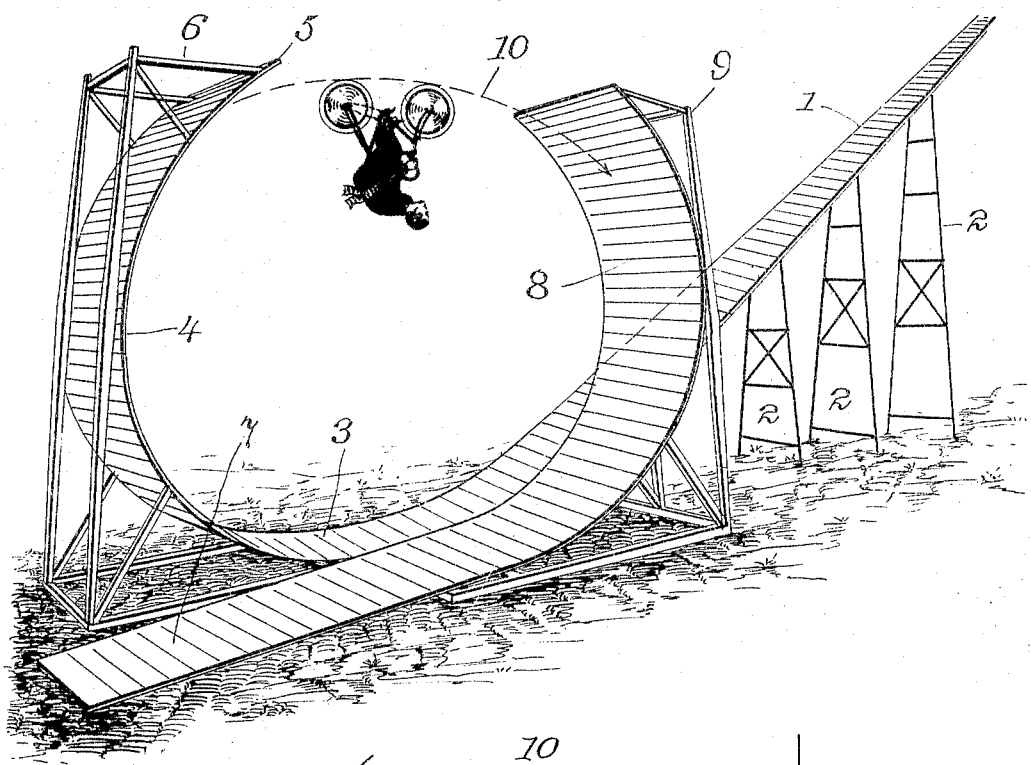
Figure 2:
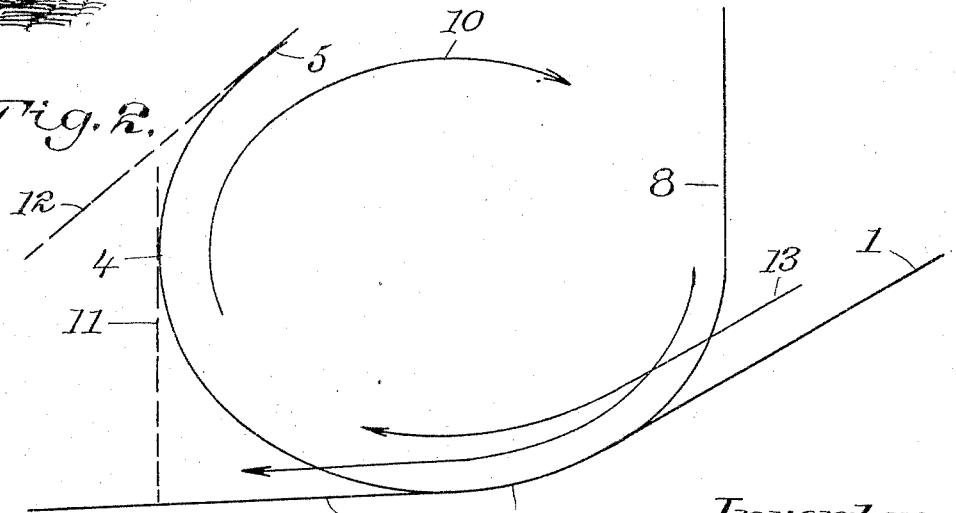

Figure 1 is a perspective view of the apparatus with a bicycle and rider in the act of jumping across the open space in an inverted position. Fig. 2 is a diagram of the runway and receiving-track, showing the course followed by the bicycle or other vehicle.

In the drawings like reference-figures indicate like parts.

1 is the main portion of the runway, which is preferably inclined downwardly at an angle which produces quite a steep gradient. 2 represents any suitable series of supports therefor.

3 represents the lowest portion of the runway, which usually rests upon the ground and as it continues onward inclines and curves upward sharply to the point 4, at which the curve becomes tangent to a vertical line 11, as shown in Fig. 2. The curve is then continued until it terminates in a portion 5, which is bent backward at an acute angle to the horizontal portion 3 of the runway and at a still more acute angle to the downwardly-inclined portion 1.

The upwardly-curved portion of the runway may be supported by the framework 6.

7 is a receiving-track, preferably located beside the runway and having, preferably, an upwardly-curved end portion 8, as shown, which is placed in the trajectory 10 of the vehicle, such as a bicycle, discharged from the runway, as shown in the drawings. This upwardly-curved portion of the receiving-track may be supported by any suitable framework 9.

The mode of operation is as follows: The bicycle and rider come down the inclined portion 1 of the runway, as indicated by the arrow 13, at a high rate of speed, run up the curved portion 4, under the portion 5, and are shot out in a reversed position, as shown in Fig. 1, along a trajectory 10 until the bicycle-wheels strike the upwardly-projecting end portion 8 of the receiving-track. Down this and along the receiving-track 7 the wheel runs until it is stopped, the wheel and rider having turned a somersault in the air.

Various changes can be made in the details of the apparatus described so long as the principle of operation is retained—that is to say, so long as the curved end of the runway curves backwardly from its point of tangency with a vertical line, or, in other words, so long as the line 5 12, tangent to the discharge end of the runway, forms an acute angle with the main portion of said runway. While the end of the receiving-track may curve toward the discharge end of the runway, this may be varied, and the last few feet of the portion 8 of the track may be made straight and vertical, as shown in Fig. 2. While I prefer to use the inclined portion 1 of the runway to get up speed, other means might be employed for giving the vehicle its necessary high velocity.

While I have shown the apparatus as adapted for and used with a bicycle, it might be employed with other forms of vehicle. These and other modifications readily occurring to those skilled in the art I should still consider within the scope of my invention.

Having therefore described my invention, what I claim as new, and desire to protect by Letters Patent, is—

1. In an amusement apparatus the combination of a runway having an upwardly-inclined end portion curved backward at an acute angle to the main portion of the runway, and a receiving-track having one end located in the trajectory of a vehicle discharged from the upwardly and backwardly inclined end portion of the runway, with a considerable open space intervening between the adjacent ends of said track and said runway.

2. In an amusement apparatus, the combination of a runway having its main portion downwardly inclined and an upwardly-inclined end portion curved backward at an acute angle to the main portion of the runway, with a receiving-track having one end located in the trajectory of a vehicle discharged from the upwardly and backwardly inclined end portion of the runway, with a considerable open space intervening between the adjacent ends of said track and said runway.

3. In an amusement apparatus, the combination of a runway having an upwardly-inclined end portion curved backward at an acute angle to the main portion of the runway, and a receiving-track having one end located in the trajectory of a vehicle discharged from the upwardly and backwardly inclined end portion of the runway, with a considerable open space intervening between the adjacent ends of said track and said runway, the runway and the receiving-track being located side by side.

4. In an amusement apparatus, the combination of a runway having an upwardly-inclined end portion curved backward at an acute angle to the main portion of the runway, and a receiving-track having one end located in the trajectory of a vehicle discharged from the upwardly and backwardly inclined end portion of the runway, with a considerable open space intervening between the adjacent ends of said track and said runway, the runway and the receiving-track being located side by side and having their upwardly-curved end portions facing one another.

5. In an amusement apparatus, the combination of a runway having an upwardly and continuously curved end portion extending beyond the point of tangency of said curve with a vertical line, with a receiving-track placed beside the runway and having an upwardly-curved end facing the upwardly-curved end of the runway.

6. An amusement structure comprising a track or way provided with a vertical loop having a permanently-open gap disposed in a portion thereof, substantially as described.

7. An amusement structure comprising a track or way provided with a vertical loop having a permanently-open gap disposed in the upper part thereof, substantially as described.

8. An amusement structure comprising a track or way provided with a substantially circular vertical loop having a permanently open gap disposed in the upper part thereof, substantially as described.

Signed at New York, N. Y., this 21st day of March, 1904.

UGO ANCILLOTTI.

Witnesses:
   WILLIAM ROBERT MACDONALD,
   JNO. DROHEN.